United States Patent [19]

Miyake et al.

[11] 4,112,044

[45] Sep. 5, 1978

[54] CHROMATOGRAPHIC SEPARATION OF URANIUM ISOTOPES

[75] Inventors: Tetsuya Miyake; Maomi Seko, both of Tokyo; Kohji Inada, Yokohama; Kazushi Ochi, Yokohama; Tomio Sakamoto, Yokohama, all of Japan

[73] Assignee: Asahi Kasei Kogyo Kabushiki Kaisha, Osaka, Japan

[21] Appl. No.: 687,840

[22] Filed: May 19, 1976

[30] Foreign Application Priority Data

Sep. 6, 1975 [JP] Japan ................................ 50-108348

[51] Int. Cl.$^2$ .............................................. C01G 56/00
[52] U.S. Cl. ........................................... 423/7; 423/6; 252/301.1 R
[58] Field of Search ................ 423/6, 7, 139, 18, 298, 423/351, 414; 252/301.1 R

[56] References Cited

U.S. PATENT DOCUMENTS

| 3,953,568 | 4/1968 | Seko et al. ............................... 423/7 |
| 3,953,569 | 4/1976 | Seko et al. ............................... 423/7 |

*Primary Examiner*—Edward A. Miller
*Assistant Examiner*—Josephine Lloyd
*Attorney, Agent, or Firm*—Burgess, Dinklage & Sprung

[57] ABSTRACT

A process for separation of uranium isotopes by chromatography through an anion exchange material is found to be improved in efficiency of separation as well as in productivity by addition of a catalyst for accelerating electron exchange reactions occurring in the system under conditions to retain uranyl ions on the anion exchange material preferentially over uranous ions.

21 Claims, No Drawings

CHROMATOGRAPHIC SEPARATION OF URANIUM ISOTOPES

This invention relates to improvement in chemical separation of uranium isotopes by use of an anion exchanger. More particularly, this invention relates to a process for separating uranium isotopes by chromatography through an anion exchanger which is improved in efficiency as well as in productivity.

A chromatographic separation of uranium isotopes by use of a anion exchanger and a redox system is disclosed in German Pat. OLS No. 2,349,595. This process has not yet realized its full potential because the degree of enrichment of uranium-235 is not sufficiently high and the yielded product is too small in amount for industrial application.

The object of the present invention is to provide a process for separating uranium isotopes by use of an anion exchanger which is improved in the degree of enrichment per unit moving distance of the uranium adsorption zone and the amount of the product as well as in stationary operational procedures.

According to the present invention, there is provided a process for separating uranium isotopes by forming a uranium adsorption zone on an anion exchange material in contact with the front boundary between an oxidizing agent zone and said uranium adsorption zone or the rear boundary between a reducing agent zone and said uranium adsorption zone or both boundaries, the said boundaries being moved by a continuous feed of an uranium solution or a reducing agent solution as an eluant solution thereby concentrating uranium-238 in the vicinity of the front boundary, uranium-235 in the vicinity of the rear boundary or both thereof, wherein the improvement comprises adding one or more electron exchange catalysts in at least one of the uranium and the reducing agent solutions to keep the electron exchange reaction rate constant $k$ in the uranium adsorption zone not less than 1 liter/mol ·minute under the conditions whereby the selectivity coefficient K/U-(IV)/U(VI) is 2 or more.

In one aspect, the present invention is based on the finding that electron exchange reactions which control the degree of separation per unit moving distance of the uranium adsorption zone can be accelerated in the presence of a catalyst. The electron exchange reaction referred to in the specification and claims is defined by the following reaction scheme:

$$^{235}U(IV) + {}^{238}U(VI) \underset{}{\overset{K}{\rightleftharpoons}} {}^{235}U(VI) + {}^{238}U(IV)$$

wherein K is an equilibrium constant:

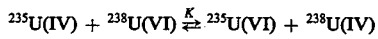

Because the equilibrium constant K is slightly larger than unity, the uranium isotopes with the mass number of 235 are concentrated in the uranyl ions in slight preference over the uranium isotopes with the mass number of 238 and vice versa in the uranous ions when the uranous ions are brought into contact with the uranyl ions. These reactions occur in multiple stages of equilibrium in the system of ion exchanger, namely while accomplishing new equilibriums from segment to segment. For example, at the boundary between the uranium adsorption zone containing uranyl ions and the reducing agent's adsorption zone, the uranyl ion adsorbed on anion exchanger is reduced to uranous ion upon contact with the reducing agent. The uranous ion thus formed is eluted from the anion exchange material and transferred by the flow of external solution to the next segment where there occurs contact between the eluted uranous ion and the uranyl ion adsorbed on the anion exchange material, whereby one step isotope equilibrium as shown in the above scheme is attained, and uranyl ion adsorbed is enriched to a slight extent in uranium-235. When the boundary is further moved by continuing the feed of the reducing agent, the uranyl ion thus enriched in urnaium-235 is reduced to uranous ion thus enriched in uranium-235 is reduced to uranous quent segment where the eluted uranous ion enriched in uranium-235 contacts the adsorbed uranyl ion in said segment to accomplish another equilibrium to form uranyl ion further enriched with uranium-235 as compared with that in the previous segment. By repetition of such procedures, uranium-235 is gradually enriched in the vicinity of the boundary. Further, at the segment which is subsequent to the nearest segment to the boundary, there occurs the enrichment of uranium-235 before contacting with the reducing agent. Namely, the uranous ion, which has accomplished equilibrium according to the mechanism as described above, contains uranium-235 in amount slightly larger than the uranous ion in the next segment. Therefore, when said uranous ion enters into the next segment, a new equilibrium is attained to form uranyl ion which is enriched in uranium-k235. In this manner, there is formed an isotope distribution wherein uranium-235 is more concentrated nearer to the boundary and less concentrated in the center of the uranium adsorption zone. Likewise, uranium-238 is concentrated in uranous ion in the vicinity of the boundary between the uranium adsorption zone and the oxidizing agent zone.

The first requirement to make the process for separation of uranium isotopes industrially useful is that the degree of enrichment of one isotope per unit moving distance of th uranium adsoprtion zone should be sufficiently high. In other words, for improvement in efficiency of separation, it is necessary to effect enrichment of one of the isotopes in a short moving distance of the boundary. For this purpose, it has now been found desirable to accomplish most promptly the electron exchange equilibrium between the said isotopes. For, if it takes too long time before the isotope equilibrium is accomplished between the uranyl ion adsorbed and the uranous ion in the external solution flowing in the direction of the eluant solution, the isotope once enriched is rather diffused in the system than transferred to the next segment on the anion exchanger for further enrichment, thus resulting in decrease in the number of effective theoretical plates of separation. According to the methods known in the art, the speed for accomplishing the electron exchange equilibrium (hereinafter referred to as the rate of electron exchange reaction) has been extremely low, so that no sufficient theoretical number of plates can be obtained and the degree of enrichment has remained on a low level. For improvement of these drawbacks, the present inventors have found that, with the co-presence of a catalyst which elevates the rate of electron exchange reaction under appropriate operational conditions, the rate of electron exchange reaction is remarkably enhanced and the numbers of theoretical plates of separation as well as the degree of enrichment are greatly increased.

The rate of electron exchange reaction is desirably at least 1 mol/liter·min and preferably 3 liter/mol·min or more in terms of the rate constant $k$ which is measured under predetermined operational conditions by the method as hereinafter described.

Example of the electron exchange catalysts found by the present inventors are:

(1) metal ions of iron, copper, indium, zirconim, germanium, vanadium, arsenic, molybdenum, rhenium, ruthenium, lanthanides, or the ions of an atomic group containing said metal, provided that the ions of the atomic group with zero valency are excluded;

(2) aliphatic, aromatic, or cyclic amines such as piperidine, piperazine, ethylene diamine, propylene di-amine, trimethylene diamine, 1,3-diaminopropane, ethanol amine, diethanol amine, aniline, p-amino phenol, o,m,p-amino phenol, o,m,p-toluidine, p-chloro aniline, p-phenylene diamine, N-methyl pyrole, imidazole 2-methyl imidazole, N-methyl imidazole, pyrazole, pyridine, $\alpha$, $\beta$ or $\gamma$-picoline, 4-ethyl pyridine, picolinic acid, nicotinic acid, oxine, oxine sulfonic acid, pyrazine, triazine, etc; derivatives thereof; and salts thereof;

(3) amino polycarboxylic acids such as imino diacetate, imino dipropionate, N-methyl imino diacetate, etc; derivatives thereof and salts thereof;

(4) aliphatic or aromatic carboxylic acids such as formic acid, acetic acid, propionic acid, monochloro acetic acid, oxalic acid, malonic acid, gultaric acid, glycolic acid, gluconic acid, lactic acid, tartaric acid, citric acid, thioglycolic acid, salicylic acid,5-sulfo salicyclic acid, etc; derivatives thereof; and salts thereof;

(5) aromatic oxysulfonic acids such as tiron, chromotropic acid, etc; and salts thereof;

(6) amino acids such as glycine, alanine, valine, glutamic acid, tyrosine, p-amino benzoic acid; and salt thereof;

(7) amino sulfonic acids such as sulfanilic acid, sulfamic acid; and salts thereof;

(8) $\beta$-diketones such as acetyl acetone, tri-fluoracetyl acetone, etc;

(9) water soluble, organic solvents such as formamide, N-methyl formamide, ethylene glycol, ethylene glycol monomethyl ether, methanol, ethanol, propanol, acetonitrile, dimethyl formamide, dimethyl sulfoxide, tetrahydrofuran, acetone, etc;

(10) quinones such as p-benzo quinone, methyl-p-benzo quinone, duro-quinone, chloranyl, chloranylic acid, o-benzoquinone, $\beta$-napthoquinone, etc;

(11) polyhydroxy aromatics such as hydroquinone, methyl hydroquinone, catechol, resorcinol, etc;

(12) alloxans, such as alloxan, methyl alloxan, ethyl alloxan, alloxantin, methyl alloxantin, etc; and others.

These electron exchange catalysts can be used either solely or in combination with two or more of catalysts. Among these, the following groups of catalysts are particularly preferred as effective catalysts to be used in the process of the invention.

(a) metal ions of iron, molybdenum, vanadium, copper, indium, rhenium, uttrium, ruthenium, arsenic; or the ions of an atomic group containing said metal, provided that the atomic group with zero valency are excluded;

(b) aliphatic, aromatic, cyclic amines such as piperidine, piperazine, ethylenediamine, propylenediamine, 1,3-diaminopropane, ethanolamine, p-phenylenediamine, imidazole, pyridine, $\alpha,\beta$ or $\gamma$-picoline,; derivatives thereof; and salts thereof;

(c) aliphatic or aromatic carboxylic acids such as acetic acid, gluconic acid, tartaric acid, citric acid, 5-sulfosalicylic acid; derivatives thereof; and salts thereof;

(d) aromatic oxysulfonic acids such as tiron, chromotropic acid; and salts thereof;

(e) water soluble organic compounds such as ethylene glycol, methanol, ethanol, propanol, acetone and acetonitrile;

(f) quinones such as p-benzo quinone, duroquinone, chloranyl, chloranylic acid and $\beta$-naphthoquinone;

(g) polyhydroxy aromatics such as hydroquinone, catechol and resorcinol;

(h) alloxans, such as alloxan, methyl alloxan, alloxantin and methyl alloxantin.

Examples of preferable combinations are as follows:

I. One or more in Group (a) - One or more in Groups (b) to (d)

II. One or more in Group (a) - One or more in Group (e)

III. One or more in Group (a) — One or more in Groups (f) to (h)

IV. One or more in Groups (b) to (d) — One or more in Groups (f) to (h)

V. One or more in Groups (b) to (d) — One or more in Group (e)

VI One or more in Groups (f) to (h) — One or more in Group (e)

Above all, when ions of iron are used solely or in combination with other metal ions and/or other catalyst compounds, a remarkable acceleration effect can be attained.

Table 1 shows some examples of $k$ values which are measured by the method as hereinafter described for various electron exchange catalysts.

Table 1

| Catalyst No. | Electron exchange catalyst compounds | concentration (M) | Proton concentration (M) | Temperature (° C) | k (l/mol . min) |
|---|---|---|---|---|---|
| | — | — | 4.0 | 90 | 0.11 |
| 1. | pyridine | 0.5 | " | " | 3 |
| 2. | pyperidine | 0.8 | " | " | 2.4 |
| 3. | imidazole | 0.4 | " | " | 2.2 |
| 4. | p-phenylenediamine | 0.5 | " | " | 2.7 |
| 5. | α-picoline | 1.0 | " | " | 3.8 |
| 6. | chloranylic acid | 0.01 | " | 80 | 5.2 |
| 7. | hydroquinone | 0.5 | " | 90 | 2.6 |
| 8. | citric acid | 1.0 | " | " | 1.1 |
| 9. | β-naphthoquinone | 0.01 | " | 70 | 4.6 |
| 10. | cuprous chloride | 0.2 | " | " | 1.7 |
| 11. | molybdenum dichloride | 0.01 | " | 90 | 5.5 |
| 12. | ferrous chloride | 0.15 | " | 70 | 1.3 |
| | ferrous chloride | 0.15 | | | |

Table 1-continued

| Catalyst No. | Electron exchange catalyst compounds | concentration (M) | Proton concentration (M) | Temperature (° C) | k (1/mol . min) |
|---|---|---|---|---|---|
| 13. | β-naphthoquinone | 0.01 | " | " | 7.4 |
| 14. | pyridine | 0.5 | " | 90 | 4.8 |
|  | citric acid | 1.0 | | | |
| 15. | ferrous chloride | 1.0 | 2.0 | 70 | 29 |
|  | acetone | 20 V/V% | | | |

The catalytic effect of each of the catalysts as enumerated above is generally in direct proportion to the concentration thereof which is to be determined by taking various factors such as the desired electron exchange rate constant, solubility of the catalyst employed, the selectivity coefficient as described below, etc. into account. A metal ion chosen from the class (1) can be used in the form of any ion irrespective of its valency. However, in case where the oxidation-reduction potential of the metal used is higher than that of uranium, uranous ion can be oxidized to uranyl ion by oxidative ions to change the ratio of the concentration of uranous ion to that of uranyl ion in the solution. Accordingly, in such a case, it is desirable to add the metal in the form of reductive ions. For example, vanadium is allowed to be present as trivalent ion in an aqueous hydrochloric acid solution with the concentration of 2 mols/liter. Furthermore, a metal ion of the kind which forms co-ordination bond with chemical species present in the system having co-ordinating ability should be added in a relatively low concentration. This is because highly negative anion complexes thus formed are adsorbed on anion exchangers negatively to affect the efficiency of separation. In a system wherein hydrochloric acid and water are used, such ions as $V(V)$, $Zr(IV)$, $Mo(VI)$, $Re(VII)$, $Sb(III)$, $Sb(V)$, $Cu(I)$, $Ge(IV)$, $Bi(III)$, $Ru(IV)$ can form complexes with $Cl^-$ ion to be adsorbed on anion exchangers. Therefore, when the catalyst is chosen from these metal ions, its concentration should be controlled to at most 0.5 mol/liter in the solution. With other metal ions, it is generally possible to vary widely the concentration, preferably in the range from 0.01 to 3 mol/liter. Typical metal ions which exhibit remarkable acceleration effect by addition of lesser amounts are those of iron, molybdenum, vanadium, copper, rhenium, yttrium, ruthenium and arsenic. Some of the organic compounds as set forth in classes (2) to (4) and (6) to (8) have larger dissociation constants as well as larger complex stability constants. These compounds can readily form complexes with uranyl or uranous ion and therefore they should be used under highly acidic conditions, for example, in an aqueous hydrochloric acid solution with a concentration of 1 to 6 mols/liter. In general, the amount of the catalyst chosen from said organic compounds can be varied within the range from 0.001 to 3 mol/liter, preferably from 0.01 to 2 mol/liter. The catalyst chosen from the organic solvents of the class (9) can be used in amounts ranging from 1 to 95 V/V %, preferably from 5 to 80 V/V %.

The rate of electron exchange reaction is affected also by the proton concentration in the system. For example, in a system wherein hydrochloric acid is used, $k$ is at its minimum when the proton concentration is in the range from 2 to 4 mols/liter and increased when the proton concentration is lower or higher than said range. However, in case of a lower proton concentration, hydrolysis of uranium ion, oxidizing agent or reducing agent is liable to occur, while in case of a higher proton concentration than 6 mols/liter, on the other hand, it is difficult to obtain sufficiently high selectivity coefficient as described below. The proton concentration can be adjusted by use of at least one acid such as hydrochloric acid, hydrobromic acid, sulfuric acid, hydrofluoric acid, etc. In view of the higher selectivity coefficient to be attained, hydrochloric acid or hydrobromic acid is preferably used in amounts ranging from 1 to 6 mols/liter.

The rate of electron exchange reaction is increased as the temperature is elevated. Since activation energy of said reaction is considerably large in the order of 10 to 40 Kcal/mol, it is preferred to conduct the reaction at a high temperature. However, various troubles such as formation of precipitates through hydrolysis of uranium, oxidizing agent or reducing agent, deterioration of ion exchanger, decrease in selectivity coefficient, etc. are liable to be caused at higher temperatures. Thus, although it is possible to conduct the reaction at 10° to 180° C, it is preferred to operate separation procedures at 60° to 150° C.

The concentrations of various components as specified in the specification and claims are in moles per liter of the external solution in contact with anion exchanger, unless otherwise indicated.

According to the present invention, it is also required to operate separation procedures under conditions which afford adsorption power of uranyl ion to an anion exchanger in the system sufficiently higher than that of uranous ion. In other words, the selectivity coefficient $K_{U(IV)}^{U(VI)}$ as defined by the following formula is required to be at least 2, preferably 5 or more.

$$K_{U(IV)}^{U(VI)} = \frac{U(VI)_R \, U(IV)_S}{U(VI)_S \, U(IV)_R}$$

wherein $U(VI)_R$ and $U(IV)_R$ are uranyl ion concentration and uranous ion concentration in an anion exchanger, respectively; and $U(VI)_S$ and $U(IV)_S$ are uranyl ion concentration and uranous ion concentration in external solution in contact with said anion exchanger, respectively.

Generally speaking, the above selectivity coefficient $K_{U(IV)}^{U(VI)}$ is desirably as large as possible for suitable distribution of both uranyl and uranous ions in ion exchanger phase and the external solution phase in contact with said ion exchanger phase. For example, we now consider a case wherein uranyl ion adsorbed on an anion exchanger contacts with a reducing agent to be reduced to uranous ion while being eluted and flown in the direction of the eluant flow. If said coefficient is not large enough in this case, uranyl ion cannot efficiently be retained on the anion exchanger but uraous ion can occupy a considerable part of adsorption sites thereof. As the result, in the vicinity of the boundary in contact with a reducing agent, reduction of uranyl ion is rendered difficult to decrease the chances of contact of uranyl ion with uranous ion. Thus, only under conditions permitting a sufficiently high selectivity coefficient, an efficient electron exchange reaction can be made possible.

There are various factors which can affect the selectivity coefficient $K_{U(IV)}^{U(VI)}$. For example, as already mentioned, the proton concentration in the system or the temperature employed has a remarkable effect on the selectivity coefficient. Depending on the electron exchange reaction catalyst to be used as well as its concentration, the selectivity coefficient can also greatly be varied. Although it is not yet theoretically established, there seems to be correlation between the types of the catalyst and the selectivity coefficient.

According to the present invention, it has been found that the principle of the invention can be applicable for three modes of the process, namely (A) a process wherein an adsorption zone of a reducing agent is provided at the rear end of and adjacent to an adsorption zone of uranium complex anions in a system of an anion exchanger to conduct reduction of hexavalent uranium anions to tetravalent uranium anions at the boundary therebetween to concentrate uranium-235 in the vicinity of said boundary while displacing said boundary through said anion exchanger;

(B) a process wherein an adsorption zone of an oxidizing agent is provided at the front end of and adjacent to an adsorption zone of uranium complex anions in a system of an anion exchanger to conduct oxidation of tetravalent uranium anions to hexavalent uranium anions at the boundary therebetween to concentrate uraium-238 in the vicinity of said boundary while displacing said boundary through said anion exchanger; and (C) a process wherein an adsorption zone of uranium complex anions is formed between adsorption zones of a reducing agent and an oxidizing agent at the rear and front ends, respectively, of the uranium adsorption zone and uranium-235 and uranium-238 are concentrated in the same manner as in the modes (A) and (B), respectively.

The process of the mode (A) can be practiced by, for example, charging first an aqueous solution containing uranyl complex anion into a system of an anion exchanger to form an uranium adsorption zone and then passing as eluant an aqueous reducing agent through said uranium adsorption zone, whereby there is formed a boundary (reduction boundary) between the uranium adsorption zone and the reducing agent zone which moves in the direction of the eluant flow. The process of the mode (B) can be practiced by, for example, charging an aqueous oxidizing agent solution into a system of an anion exchanger to form an adsorption zone of oxidizing agent and then passing an aqueous solution containing uranous complex anion as eluant through the adsorption zone of the oxidizing agent, whereby there is formed a boundary (oxidation boundary) between the adsorption zone of the oxidizing agent and the uranium adsorption zone which moves in the direction of the eluant. The process of the mode (C) can be practiced by, for example, charging first an aqueous oxidizing solution into a system of an anion exchanger to form an adsorption zone of oxidizing agent and then passing an aqueous solution containing uranous complex anion as eluant through the adsorption zone of the oxidizing agent, followed further by charging an aqueous reducing agent solution, whereby there are formed both oxidation and reduction boundaries in the forward and rearward of the uranium adsorption zone, respectively, in the direction of the eluant flow which move simultaneously in the same direction of the eluant flow.

The oxidizing agent suitable for the present process is selected from those which can promptly oxidize uranous ion to urayl ion in an anion exchanger as well as in the external solution. Typical examples of such oxidizing agents are divalent copper salts, trivalent iron salts, tetravalent cerium salts, divalent manganese salts, tetravalent vanadium salts, hexavalent molybdenum salts and trivalent thallium salts. The concentration of the oxidizing agent in the external solution can be varied from 0.02 to 2.0 mol/liter corresponding to the concentration of uranium ion in the external solution which is variable from 0.01 to 1.0 mol/liter.

On the other hand, the reducing agent suitable for the present process is selected from those which can promptly reduce uranyl ion to uranous ion in an anion exchanger as well as in the external solution. Typical examples are trivalent vanadium salts, pentavalent molybdenum salts, trivalent titanium salts, and divalent tin salts. The concentration of the reducing agent can be varied from 0.02 to 1.0 mol/liter corresponding to the concentration of uranium ion in the external solution which is variable from 0.01 to 1.0 mol/liter.

Examples of anion exchanger useable in the process of the present invention are strongly basic anion exchange resins having quaternary ammonium groups prepared by chloromethylating styrene-divinyl benzene copolymers, followed by amination; weakly basic anion exchange resins having primary or tertiary amine groups.

The anion exchangers to be used in the present invention are desired to have preferred adsorption power for uranyl ion over uranous ion and also to be small in degree of swelling or shrinking when contacted with various solutions such as of oxidizing agent, reducing agent or uranium. Furthermore, they should effect rapid adsorption and desorption enough to prevent once separated isotopes from re-mixing. From these standpoints, the anion exchange resins as disclosed in the copending applications Ser. Nos. 687,844 and 687,843 filed on even date herewith, entitled "ANION EXCHANGE RESIN FOR URANIUM TECHNOLOGY" are particularly preferred in the present invention. Thus, the subject matter of said copending application is herein incorporated by reference.

The uranium ion concentration in the external solution can be varied from 0.01 to 1.0 mol/liter, preferably from 0.10 to 0.50 mol/liter, more preferably from 0.10 to 0.40 mol/liter. The concentration of uranium ion is determined by considering desired product yield and the flow rate constant which is determined by dividing the linear velocity of the eluant by the moving speed of the uranium adsorption zone. It has been found that the degree of enrichment per unit moving distance is improved by decreasing the flow rate. On the other hand, by decrease of the flow rate, the amount of the product obtained in unit time is decreased. Therefore, it is necessary to increase the concentration of uranium ion as well as those of oxidizing agent and reducing agent, correspondingly, in order to maintain the flow rate constant, namely to maintain the product yield at a constant level when the flow rate constant is decreased. However, if the uranium ion concentration is too high, namely exceeding 1.0 mol/liter, unfavorable phenomena are found to occur in the vicinity of the boundaries. That is, near the reduction boundary, uranous ions formed by reduction of uranyl ions cannot completely be eluted and left behind the boundary, or alternatively, near the oxidation boundary, uranyl ions formed by oxidation of uranous ions cannot sufficiently be retained on the ion exchanger but penetrate into the adsorption zone of the oxidizing agent. Thus, in either case, separation efficiency is decreased due to insufficient contact between uranyl and uranous ions in the vicinity of each boundary.

Furthermore, the ratio of uranous ion concentration to uranyl ion concentration (hereinafter referred to as "reduction ratio R") in the external solution is found to affect the separation efficiency. It is closely correlated with the selectivity coefficient $K_{U(IV)}^{U(VI)}$. The separation efficiency is found to be at its maximum when the reduction ratio R is substantially equal to the square root of the selectivity coefficient. The reduction ration R can be optimized easily by adjusting the concentration of the reducing agent or the ratio of uranous ion concentration to uranyl ion concentration of the feeding uranium solution at a suitable value.

When the operation is performed at a temperature of 60° C or higher, some of the metal ions used as reducing agent or oxidizing agent are liable to be hydrolyzed to form precipitates. These precipitates are not favorable since they are accumulated in the system to increase the pressure drop remarkably and cause other unfavorable phenomena. Especially, when there is used as reducing agent trivalent titanium which is preferably because of its excellent characteristics (excellent selectivity, large rate of reduction, etc.), precipitates are gradually formed by being heated in a strongly acidic solution. Some of the organic compounds are found to be effectively added for preventionof precipitate formation. They include aliphatic polycarboxylic acids such as oxalic acid, tartaric acid, citric acid, malonic acid, glutaric acid, succinic acid, maleic acid, fumaric acid, and salts thereof; aromatic carboxylic acids such as salicylic acid, 5-sulfosalicylic acid, and salts thereof; polyhydroxy aromatic compounds such as catechol, resorcinol, tiron, and chromotropic acid; monosaccharides, alkyl derivatives thereof, derivatives obtained by oxidation or reduction thereof or salts of these derivatives, e.g. glucose, fructose, mannose, galactose, arabinose, ribose, xylose, erythrose, sorbitol, mannitol, arabitol, glucono-δ-lactone, glucono-γ-lactone, gluconic acid, mannonic acid, uronic acid, α-keto gluconic acid, and methyl glucoside. Such a compound is added in an amount ranging from 0.1 to 3 mol/liter. Some of the organic compounds as mentioned above have also an effect to accelerate electron exchange reaction. Therefore, when such a compound is used as the catalyst for electron exchange reaction, there is no need to further add a precipitation preventing agent.

In practicing the process of the present invention, conventional ion exchange columns can be used. A preferred ion exchange column for practice of the invention is a corrosion-resistant vessel coated with heat insulating material on the surface and equipped with a jacket for passing heat transfer medium to keep the column at a constant temperature. The shape and the size of the vessel is not particularly limited, but should be determined with due consideration for the uniform flow of eluant solution as well as ease of operation. The size is determined mainly from the desired product yield. In order to afford uniform flow of solutions through the bed of anion exchange resins, the column may preferably be equipped at the inlet with a distributor. Furthermore, it may preferably be equipped at the outlet with a filter and a collecting plate, in order to collect the eluant solution uniformly from all of cross-sectional area of the column. When the ion exchange column has both of these devices as mentioned above equipped at inlet and outlet, respectively, they should be provided in a manner such that there should be little dead space between said distributor and the resin bed and between the collecting plate and the resin bed. Two or more columns combined can also be used, especially in continuous operations. The details of one example of preferably ion exchange column or arrangement thereof are described in the copending application filed on even date herewith, entitled "ION EXCHANGE APPARATUS FOR URANIUM TECHNOLOGY," of which the subject matter is herein incorporated by reference.

Referring now to operational procedures of the process according to mode C as mentioned above, an oxidizing solution is in the first place fed to an ion exchange column packed with anion exchanger. Preparation of the anion exchange column is carried out generally in the following manner. Anion exchange resin particles, from which remaining impurities (e.g., organic solvents, metals, etc.) are eliminated, are purified by washing with methanol, hydrochloric acid or sodium hydroxide, etc. Packing of anion exchange resins can be conducted either by wet packing with solvents or by dry packing. The solvents used in wet packing are not restricted and are generally selected from at least one of hydrchloric acid solutions, oxidizing agent solutions, uranium solutions, reducing agent solutions, water and organic solvents. Into the said solvent, anion exchangers are poured to form a slurry solution. The slurry solution thus formed is packed in the column by gas pressure, pump and sedimentation. On the other hand, in case of dry packing, the ion exchangers after dehydration or drying are thrown into the column and the air contained in the column is replaced completely with the solvent as used in wet packing as mentioned above. Packing should be conducted so as to form a uniformly packed bed, and for this purpose, such methods as high speed packing of slurry solution or packing with vibration are frequently employed. On the other hand, the oxidizing solution is prepared by mixing an oxidizing agent, an inorganic acid and water (together with other substances such as organic solvents, etc., if desired) in predetermined concentrations, respectively. The feeding speed of the oxidizing agent solution is controlled by adjusting the valve equipped at top or bottom of the column or by feeding with a constant flow rate pump. The adsorption speed (the moving speed of the frontal boundary of the oxidizing agent adsorption zone) is not particularly limited. But, when two or more columns are employed for continuous operation and anion exchangers in these columns are converted successively to the form of oxidizing agent, the next column must be changed to the form of oxidizing agent while the uranium adsorption zone passes through the preceding column. Therefore, the adsorbing speed of the oxidizing agent is often determined so as to be larger than the moving speed of the uranium adsorption zone. The adsorbing speed of the oxidizing agent solution can be varied widely when all of the columns are converted to the form of oxidizing agent at the same time. When the frontal boundary of the oxidizing agent adsorption zone is observed to reach one end (top or bottom) of the column, or the concentration of the oxidizing agent solution outflown from the end becomes nearly equal to the feed concentration, the feed of the oxidizing agent solution is discontinued.

As the second step, after the oxidizing agent adsorption zone is formed by the above operation, a uranium solution containing uranous ion is supplied to the column. Uranium solution is prepared by mixing concentrated uranous solution (and concentrated uranyl solution, if desired) and water (together with other substances such an electron exchange catalyst, organic solvents, etc.) in predetermined concentrations, respectively. The moving speed of the frontal boundary of the uranium adsorption zone is adjusted to a determined value by controlling the flow rate similarly as described above in supply of the oxidizing agent solution. As long as the supply of uranium solution is continued, the boundary between uranium adsorption zone and oxidizing agent adsorption zone moves through the column, usually keeping a clear boundary. The feeding of uranium solution is discontinued before the boundary reaches the end of the column opposite to the direction of eluant flow.

As the third step, a reducing agent solution is fed to the column, whereby a uranium adsorption zone is formed between the oxidizing agent zone and the reducing agent zone. The reducing agent solution is prepared by mixing a reducing agent, an electron exchange catalyst and water (together with other substances such as organic solvents, precipitation preventing agent, etc.) in predetermined concentrations, respectively. It is critically required that the reducing agent solution should contain an electron exchange catalyst in order to obtain a multiplied separation effect. Uranium-235 is concentrated in the vicinity of the rear boundary and uranium-238 in the vicinity of the frontal boundary. The length of the uranium adsorption zone is controlled desirably depending on the moving distance. The flow rate of the reducing agent solution is determined to be approximately the same as that of uranium solution, but sometimes slightly modified according to the moving speed of the boundary. Feeding of the reducing agent solution is continued until the uranium solution ceases to outflow from the end of the column.

As mentioned above, the operation is usually conducted by moving the boundary within a finite distance with two or more columns combined, but the operation can also be conducted by moving the boundary for infinite distance by adoption of a recycle system.

Alternatively, for operation of the process of mode (A), the procedures as described above in the first and the second steps can be followed. In this case, however, feeding of the uranium solution is continued until the oxidation boundary reaches the outlet of the column (that of the last column in case of plural columns combined).

On the other hand, the process of mode B is operated by first feeding a uranium solution to the anion exchange column. The uranium solution fed in this case is prepared by mixing concentrated uranyl solution (and concentrated uranous solution, if desired), an electron exchange catalyst and water (together with other substances such as organic solvents, etc., if desired). Then, the reducing agent solution is fed to the adsorption zone of uranium thus formed, whereby a reduction boundary is formed in the rear part of the adsorption zone. The procedure for moving the boundary and other operations are substantially the same as described in the third step of the process according to mode C.

The present invention is described in further detail by the following Examples and Comparative Examples, wherein measurements of various factors are conducted in the following manner:

I. $k$ (rate constant of electron exchange reaction):

The electron exchange reactions involved herein should in more strict sense include not only those in the external solution, but also those between the interior and the exterior of anion exchanger. But, since the rate of electron exchange in the external solution is closely correlated with that of electron exchange reaction between the interior and the exterior of ion exchanger, a catalyst having a large rate of electron exchange measured in the solution is generally confirmed to have a large rate also in the system containing ion exchanger. Accordingly, in the present invention, the rate constant $k$ is measured in a solution in the following manner.

In a thermostat chamber kept at a predetermined operational temperature are provided two flasks, one of 200 ml and the other 50 ml. Twenty ml of an aqueous uranyl solution is prepared and introduced into the 200 ml flask, which is then flushed with nitrogen. Said solution contains depleted uranyl ion with isotope mol fraction of 0.4658% ([U(VI)] = 0.1 mol/liter) and is conditioned under operational conditions to be measured by adding a predetermined amount of a catalyst to be used, hydrochloric acid, etc. Similarly, twenty ml of an aqueous uranous solution is prepared from natural uranous ion with isotope mol fraction of 0.7200% ([U(IV)] = 0.1 mol/liter) and conditioned in the same manner as in case of the uranyl solution. Said uranous solution is introduced into the 50 ml flask, which is then flushed with nitrogen. After about 15 minutes, the whole amount of the uranous solution is transferred promptly into the 200 ml flask and mixed sufficiently with the uranyl solution. One minute after the addition, the 200 ml flask is taken out quickly from the thermostatic chamber and the mixture is poured into a flask of 200 ml containing 40 ml of 4 mol/liter of hydrochloric acid which has previously been cooled to 0° C on an ic-bath to terminate the reaction. Immediately thereafter the resultant mixed solution is passed through a glass column of 3 cm in diameter and 10 cm in length packed with anion exchange resins (Dowex 1 × 4, 100–200 mesh) to separate uranyl ion only by adsorption and the effluent of the aqueous uranous solution is recovered from the column bottom. The isotope mol fraction is determined as $X_t$ by measurement of this sample by mass spectrometer.

The exchange ratio F is defined and calculated by the following equation:

$$F = \frac{X_t - X_0}{X_\infty - X_0}$$

wherein $X_0$ denotes the isotope mol fraction of uranous ion, namely, 0.7200%, and $X_{28}$ that at the time of equilibrium, namely ½ × (0.7200 + 0.4658) = 0.5929%.

The rate constant $k$ is calculated from the isotope exchange ratio F by the following equation:

$$k = \frac{-\ln(1-F)}{[U(IV)] + [U(VI)]} \times \frac{1}{t} \text{ (liter/mol . min)}$$

wherein U(IV) and U(VI) are concentrations of uranous and uranyl ions, namely each being equal to 0.1 mol/liter, and $t$ is the time of the reaction, namely 1 minute.

II. $K_{U(IV)}^{U(VI)}$ (selectivity coefficient)

On gram of a dry resin to be used is weighed into a column equipped with a jacket, having an inside diameter of 10 mm and a length of 100 mm. While the column is kept at a predetermined operational temperature, 300 ml on 1N aqueous hydrochloric acid solution is passed therethrough, followed by washing with 500 ml of pure water.

A concentrated uranous solution is prepared by dissolving metallic uranium in concentrated hydrochloric acid and removing by filtration a small quantity of the precipitates produced. A concentrated uranyl solution is prepared by oxidation of the uranous solution prepared in the aforesaid manner, namely by adding a slight excess of hydrogen peroxide and boiling the mixture for 30 minutes. A mixture is prepared by blending these uranous and uranyl solutions and further adding water, electron exchange catalysts and other additives to be used in the operational procedure. For the purpose of measurement, the concentrations of uranous ions are made equal and the total concentration is adjusted at the uranium ion concentration in the external solution at the time of operation of chromatography. The mixture thus prepared is passed through the column as mentioned above sufficiently until the uranium ions are adsorbed to the equilibrated adsorption amount. Then, dry nitrogen gas is passed through the column to remove the uranium solution ions adhered outside of the resin. The adsorbed uranium ions are eluted with 1 mol/liter aqueous hydrochloric acid into a vessel provided at the bottom of the column. To a portion of the eluant, a small quantity of 3% aqueous hydrogen peroxide solution, 20% aqueous sodium hydroxide solution and 20% aqueous sodium carbonate solution is added, thereby developing the yellow color, and then the total concentration of uranium is measured by colorimetric analysis at 390 mμ. On the other hand, the concentration of uranous ion is determined by colorimetric analysis at 650 mμ of a portion of the eluant collected. The concentration of uranyl ion is determined as the difference between these concentrations. From the values of the concentrations of the uranium ions in the resin thus determined and those of the solution, the selectivity coefficient is calculated.

III. R (reduction ratio)

In a chromatographic column packed with an anion exchanger, an aqueous solution (0.1 mol/liter) of uranyl ion having natural isotopic ratio $r_0$ is supplied in sufficient amount to form a uranyl ion adsorption zone. After uranyl ions are equilibrated between the solution and the anion exchanger, a reducing agent solution with a predetermined concentration is supplied as an eluant solution to elute uranyl ions while conducting reduction thereof. The eluted effluent from the bottom of the column is collected in fractions with the same amount of each fraction. With a portion of these fractions, the total uranium concentration and the uranous concentration are analyzed quantitatively by colorimetric analysis. Further with a portion of these fractions, the isotope mole fraction is determined by mass spectrometer. From the chromatogram depicted from these results, the average reduction ratio R is calculated.

IV. ε (Effective separation factor)

From the uranium concentration curve and the uranium isotope distribution curve made from the data obtained in the measurement of R as described above, the total amount of uranium contained in anion exchanger (Q mol) and the total amount of uranium-235 separated (D) are determined, respectively. The effective separation factor is calculated by the following equation:

$$\epsilon = \frac{D}{Q - D} \cdot \frac{1}{r_0}$$

EXAMPLE 1

To a four-necked flask of 4 l capacity, 2000 g of water and 2.5 g of methyl cellulose were introduced, and then 3.8 g of azobisisobutyronitrile, 60 g of divinyl benzene, 10 g of ethyl vinyl benzene, 130 g of 4-vinyl pyridine and 550 g of dimethyl terephthalate were introduced, to form oily particles. Then, polymerization was effected at 70° C for 60 hours. After polymerization, the product was cooled and was thoroughly washed in a resin washing column equipped with a filter with 10 l of methanol and 100 l of water. The exchange capacity of thus obtained resin was 3.75 milliequivalent/g.

In a chromatographic column equipped with a jacket, having a diameter of 20 mm and a length of 1200 mm, with a filter at the bottom, the above resin was filled up to the height of 1000 mm, and then aqueous 6N hydrochloric acid was passed therethrough for washing.

An oxidizing agent solution containing ferric chloride [Fe(III)] as oxidizing agent, a uranium solution containing uranous ion ([U(IV)] and a reducing agent solution containing titanium trichloride [Ti(III)] (obtained by dissolving spongy titanium in concentrated HCl) as reducing agent were prepared. Each solution was made in an aqeous hydrochloric acid solution and ferrous chloride is added to each solution together with β-naphthoquinone as electron exchange catalyst. The composition of each solution is as shown below:

| | | |
|---|---|---|
| oxidizing agent solution: | ferric chloride Fe(III) | 0.08 M |
| | ferrous chloride Fe(II) | 0.80 M |
| | β-naphthoquinone | 0.02 M |
| | hydrochloric acid | 3.5 M |
| uranium solution: | uranous ion [U(IV)] | 0.20 M |
| | ferrous chloride | 0.80 M |
| | β-naphthoquinone | 0.02 M |
| | hydrochloric acid | 3.5 M |
| reducing agent solution: | titanium trichloride Ti(III) | 0.30 M |
| | ferrous chloride | 0.80 M |
| | β-naphthoquinone | 0.02 M |
| | hydrochloric acid | 3.5 M |

By supplying the oxidizing agent solution to the column kept at 90° C, the whole of the anion exchanger was substituted with the oxidizing agent. Subsequently, the uranium solution was supplied so as to oxidize uranous ion to uranyl ion by contacting with the oxidizing agent, whereby uranyl ion was adsorbed onto the anion exchanger. The uranium adsorption zone was gradually enlarged, as the supply of te uranium solution and after reaching to 50 cm, the supply of the uranium was ceased. Then, by supplying the reducing agent solution to the column, the uranyl ion adsorbed was reduced at the rear boundary to uranous ion, which after moving in a direction of eluant procession to the front boundary, was again oxidized to uranyl ion and adsorbed.

As long as the supply of the reducing agent solution was continued, the uranium adsorption zone continued to move until the front boundary of the uranium adsorption zone reached to the bottom of the column. The uranium solution outflown from the outlet of the column was collected in fractions of each 5 ml. When the reducing agent solution began, after the outflow of the rear boundary of the uranium adsorption zone, to outflow, the supply of the reducing agent solution was stopped. During the operation, the flow rate of the eluant was maintained at 309 ml/hour, and the boundary moving speed was 10.3 m/day.

The concentration of the sample collected, analyzed quantitatively by the fluororescent X-ray analysis and the colorimetric analysis, was almost constant except for the vicinity of the boundary. Namely, the uranyl concentratin was 0.049 M, and the uranous concentration was 0.145 M. Under this condition, $k$ and $K_{U(IV)}^{U(VI)}$ were measured to be 41 l/mol·min and 11, respectively.

Further, the isotope ratios of the fractions closest to the front and rear boundaries, measured by mass spectrometer, were 0.006806 in the vicinity of the front boundary and 0.007704 in the vicinity of the rear boundary, which were 0.9385 times and 1.0623 times, respectively, as large as the natural isotope ratio 0.007252.

If the separation effect is defined by the degree of enrichment per 1 meter (%/m) multiplied by the boundary moving speed (m/day), the separation effect was nearly 15 to 40 times larger than that of control 1 or German Pat. OLS No. 2349595.

Control 1

Separation of uranium isotope was conducted in the same manner as in Example 1 except that no electron exchange catalyst, i.e., ferrous chloride and β-naphthoquinone, was added to each solution and the flow rate and the moving speed of the boundary was 161 ml/hr, 5.1 m/day respectively. Under these conditions, $K$ and $K_{U(IV)}^{U(VI)}$ were measured to be 0.08 l/mol·min and 9.8, respectively. The isotope ratios were 0.007188 in the vicinity of the front boundary and 0.007309 in the vicinity of the rear boundary.

EXAMPLEX 2 - 8

Into a four-necked flask, 2000 g of water, 2.5 g of methyl cellulose, 1.2 g of gelatin, 12 g of sodium chloride and 15 g of sodium pyrophosphate were charged and mixed under stirring. Into this mixture was stirred a polymerizing solution, comprising 4.3 g of azobisisobutyronitrile, 200 g of isoamyl acetate, 40 g of n-heptane, 20 g of styrene, 16 g of ethyl vinyl benzene and 144 g of 2-vinyl pyridine, thereby to form a suspension of oily particles. Polymerization was effected at 70° C for 60 hours, followed by thorough washing in a column equipped with a filter with 20 l of benzyl alcohol, 20 l of methanol and 200 l of water. The exchange capacity of the resin thus prepared was 4.58 milliequivalent/g.

Into a chromatographic column equipped with a jacket having a diameter of 20 mm and a length of 1200 mm, the above resin was filled up to the height of 1000 mm and then was thoroughly washed with aqueous 6N hydrochloric acid.

The uranium solution and the oxidizing agent solution having the composition as described in Table 2 were prepared. For each of the thus prepared, the uranium solution was supplied to the column kept at 90° C thereby adsorbing uranyl ion, and then the reducing agent solution was supplied thereby moving the boundary of the uranium adsorption zone and the reducing agent adsorption zone. When the boundary reached to the bottom of the column, every 5 ml of the outflowing uranium solution was collected. The isotope ratio in the vicnity of the boundary was measured, and the result are shown in Table 3.

Table 2

| Example No. | the concentration of U(VI) (M) | the concentration of Ti(III) (M) | proton concentration (HCl) (M) | electron exchange catalyst compounds | concentration | k (l/mol.min) | $K_{U(IV)}^{U(VI)}$ |
|---|---|---|---|---|---|---|---|
| 2 | 0.10 | 0.40 | 4 | FeCl$_2$ pyridine | 0.75 (M) 0.30 (M) | 37 | 11.8 |
| 3 | 0.15 | 0.30 | 3.5 | VCl$_3$ acetic acid | 0.20 (M) 5(V/V%) | 17 | 8.7 |
| 4 | 0.10 | 0.30 | 3.5 | CuCl alloxan | 0.05 (M) 0.1 (M) | 10 | 6.2 |
| 5 | 0.08 | 0.30 | 3.0 | FeCl$_2$ | 1.5 (M) | 85 | 9.5 |
| 6 | 0.20 | 0.60 | 3.5 | hydroquinone citric acid | 0.4 (M) 0.5 (M) | 4.5 | 10.9 |
| 7 | 0.10 | 0.40 | 2.5 | MoCl$_2$ n-propanol | 0.05 (M) 30(V/V%) | 41 | 13.4 |
| 8 | 0.10 | 0.20 | 4.0 | imidazole ethylene diamine | 0.5 (M) 0.4 (M) | 5.1 | 7.9 |
| 9 | 0.10 | 0.35 | 2.5 | FeCl$_2$ α-picoline | 1.0 (M) 0.3 (M) | 62 | 9.1 |

Table 3

| Ex. No. | the boundary moving speed (m/day) | appearance of the boundary | isotope ratio | separation effect (times larger than control 1) |
|---|---|---|---|---|
| 2 | 15.8 | clear | 0.007580 | 18 |
| 3 | 21.3 | slightly unclear | 0.007440 | 14 |
| 4 | 13.9 | " | 0.007427 | 8 |
| 5 | 15.9 | clear | 0.007725 | 26 |
| 6 | 33.4 | " | 0.007352 | 12 |
| 7 | 17.3 | slightly unclear | 0.007487 | 14 |
| 8 | 10.2 | clear | 0.007468 | 8 |
| 9 | 9.8 | " | 0.007808 | 19 |

Control 2

Anion exchanger used in Examples 2 - 9 was filled in a column and the experiment was conducted in the same manner as in Examples 2 - 9, except that a uranium solution and a reducing agent solution with the following composition were used.

uranium solution: U(VI) 0.03 M, VCl$_3$ 0.2 M, hydrochloric acid 8 M;

reducing agent solution: Ti(III) 0.06 M, VCl$_3$ 0.2 m, hydrochloric acid 8 M

Under these conditions k was 5.4 and $K_{U(IV)}^{U(VI)}$ was 0.95.

At a lapse of a certain time after the supply of oxidizing agent solution, the boundary becomes unclear. Then, finally the boundary disappears and operation can no further be continued.

EXAMPLES 10 – 15

The experiment was conducted in the same manner as in Examples 2 – 9, except that the compositions of the uranium solution and the reducing agent solution are changed to those as shown in Table 4. The results are shown in Table 5.

Table 4

| Ex. No. | U(VI) concentration (M) | Ti(III) concentration (M) | hydrochloric acid concentration (M) | Catalyst species | concentration (M) |
| --- | --- | --- | --- | --- | --- |
| 10 | 0.01 | 0.02 | 3.5 | FeCl$_2$ | 0.3 |
|    |      |      |     | Alloxan | 0.1 |
| 11 | 0.06 | 0.12 | "   | "   | "   |
| 12 | 0.08 | 0.20 | "   | "   | "   |
| 13 | 0.15 | 0.30 | "   | "   | "   |
| 14 | 0.30 | 0.50 | "   | "   | "   |
| 15 | 0.30 | 0.60 | "   | "   | "   |

Table 5

| Ex. No. | $K_{U(IV)}^{U(VI)}$ | isotopic ratio | the boundary moving speed | appearance of the boundary |
| --- | --- | --- | --- | --- |
| 10 | 40 | 0.007348 | 3.9 | slightly unclear |
| 11 | 24 | 0.007353 | 10.8 | clear |
| 12 | 18 | 0.007492 | 5.5 | " |
| 13 | 10 | 0.007539 | 6.8 | " |
| 14 | 7.2 | 0.007502 | 6.4 | slightly unclear |
| 15 | 6.7 | 0.007491 | 7.1 | " |

EXAMPLES 16 – 20

The anion exchange resin used in examples 2 – 9 was packed in the jacketed chromatographic column (inside diameter 20 mm) kept at 80° C, to the height of 92 cm, and thoroughly washed with 6N hydrochloric acid.

By supplying the uranyl solution having the composition as shown in Table 6 thereby to substitute to uranyl ion form and then by supplying the reducing agent solution having the composition as shown in Table 6, the separation was conducted in the same manner as in Examples 2 – 9. The whole of the effluent of uranium was collected in 5 ml fractions and the concentrations of these fractions were determined by fluorescent X-ray analysis and colorimetric analysis. Then, by measuring the isotope ratios subsequently from the nearest fraction to the boundary, the chromatograms of the total uranium concentration, and uranyl concentration, the isotope ratios over the whole region of the enriched part were made, respectively.

The total amount of $^{235}$U separated in the enriched part D is calculated by the following formula:

$$D = \int (r-r_0) \cdot C_U dV$$

r : the isotope ratio at V ml of the eluant volume
$r_0$ : the atom fraction of natural uranium (0.007200)
$C_U$: total concentration of uranium in dVml of the eluant volume.

Effective separation factor ε was calculated by the equation as previously described. Reduction ratio R was determined by the ratio of uranous ion divided by uranyl ion, being constant from the chromatogram. The results are shown in Table 6.

Table 6

| Ex. No. | U(VI) concentration (M) | Ti(III) concentration (M) | Catalyst | reduction ratio (R) | $\sqrt{K_{U(IV)}^{U(VI)}}$ | effective separation factor (ε) $\times 10^{-4}$ |
| --- | --- | --- | --- | --- | --- | --- |
| 16 | 0.20 | 0.10 | FeCl$_2$ 1.0M | 1.6 | 4.1 | 6.6 |
| 17 | "    | 0.15 | "              | 2.1 | 3.7 | 7.4 |
| 18 | "    | 0.20 | "              | 2.4 | 3.6 | 7.7 |
| 19 | "    | 0.31 | "              | 3.6 | 3.4 | 8.9 |
| 20 | "    | 0.40 | "              | 6.5 | 2.9 | 7.5 |

EXAMPLE 21

A concentrated titanium trichloride solution is prepared by dissolving spongy titanium in a concentrated hydrochloric acid. A concentrated Ti(IV) solution is also prepared, by mixing 10% aqueous hydrogen peroxide solution with the concentrated titanium trichloride solution as prepared above in equivalent amounts until the violet color of Ti(III) is faded to form a colorless, transparent solution.

Mixtures (each 100 ml) of the thus prepared Ti(III) and Ti(IV) solutions with Ti(III) concentration of 0.2M and Ti(IV) concentration of 0.2M containing the titanium precipitation preventing agent, hydrochloric acid, and water in amounts as shown in Table 7 were prepared as samples. In the test tubes equipped with stopper, each having the inner volume of 200 ml, the said sample solutions were introduced, respectively, and after dissolved oxygen and air were removed by highly purified nitrogen, the tubes were sealed tightly and dipped in a water bath kept at the temperature of 95° C. The wall and the bottom of the said test tubes were observed with naked eyes to measure the time before the white precipitates of Ti(IV) appear. The results are shown in Table 7.

Table 7

| Ex. No. | titanium precipitation preventing agent species | concentration (M) | concentration of hydrochloric acid (M) | the period of appearance of precipitates (hrs) |
| --- | --- | --- | --- | --- |
| 1(control) | — | — | 4 | 0.5 |
| 2(control) | — | — | 1 | ≃0 |
| 3 | chromotropic acid | 0.2 | 3.5 | 18 |
| 4 | catechol | 0.5 | 4 | 8 |
| 5 | citric acid | 0.2 | " | 15 |
| 6 | tiron | 0.1 | " | 27 |
| 7 | tartaric acid | 0.2 | " | 23 |
| 8 | 5 sulfosalicylic acid | " | " | 20 |
| 9 | sodium gluconate | 0.15 | " | 85 |
| 10 | mannitol | " | " | 70 |
| 11 | glucono-δ-lactone | " | 5 | 55 |
| 12 | glucono-γ-lactone | " | " | 48 |

EXAMPLE 22

In two chromatographic columns (column A and column B), each being equipped with jacket and having an inner diameter of 200 mm and a length of 2000 mm, the same resin as used in Example 1 was filled up to the height of 1800 mm. Into the said two columns kept at 100° C, were supplied the uranium solutions having the following compositions, respectively:

column A: U(VI) 0.10M; Fe(II) 0.20M; HCl 4.0M
column B: U(VI) 0.10M; Fe(II) 0.20M; HCl 4.0M; sodium gluconate 0.20M, thereby to form a uranium adsorption zone, and there was further supplied the reducing agent solution having the following compositions, respectively, such as:

column A: Ti(III) 0.3M, Fe(III) 0.2M; HCl 4.0M
column B: Ti(III) 0.3M, Fe(II) 0.2M; HCl 4.0M; sodium gluconate 0.20M, thereby to move the boundary. The separation was conducted in each column by operating in the same manner as in Examples 2 – 9 and the isotopic ratio most closely adjacent to the boundary was measured. In each operation, large amount of Ti(IV) precipitates are formed on the inside wall of the column and the surface of the resin was colored in white grey color, so that it became difficult to observe the boundary by eye. After 4N hydrochloric acid was supplied in the column A and the column B to remove Ti(III) remaining, the above operation was further repeated two times. The results of measurements of the isotopic ratios are shown in Table 8.

Table 8

| the number of operation times | isotopic ratio | |
| --- | --- | --- |
| | column A | column B |
| the first operation | 0.007381 | 0.007429 |
| the second operation | 0.007324 | 0.007418 |
| the third operation | 0.007291 | 0.007433 |

We claim:

1. In a process for separating uranium isotopes by forming a uranium adsorption zone on an anion exchange material in contact with the front boundary between an oxidizing agent zone and said uranium adsorption zone or the rear boundary between a reducing agent zone and said uranium adsorption zone or both boundaries, the said boundaries being moved by a continuous feed of an uranium solution or a reducing agent solution as an eluant solution thereby concentrating uranium-238 in the vicinity of the front boundary, uranium-235 in the vicinity of the rear boundary or both thereof, the improvement which comprises adding one or more electron exchange catalysts in at least one of the uranium and the reducing agent solutions to raise the electron exchange reaction rate constant $k$ in the uranium adsorption zone to at least 1 liter/mol min while the selectivity coefficient $K_{U(IV)}^{U(VI)}$ is 2 or more.

2. A process as claimed in claim 1, wherein an eluant solution of a uranium isotope mixture containing U(IV) compounds is fed to an anion exchange material on which an oxidizing agent is previously retained to form a boundary between the uranium adsorption zone and the oxidizing agent zone thereby to concentrate uranium-238 in the vicinity of said boundary.

3. A process as claimed in claim 1, wherein an eluant solution containing a reducing agent is fed to the uranium adsorption zone having U(VI) compounds adsorbed on the anion exchange material to form a boundary between the uranium adsorption zone and the reducing agent zone thereby to concentrate uranium-235 in the vicinity of said boundary.

4. A process as claimed in claim 1, wherein a solution of a uranium isotope mixture containing U(IV) compounds is fed to an anion exchange material on which an oxidizing agent is previously retained to form one boundary between the uranium adsorption zone and the oxidizing agent zone and an eluant solution containing a reducing agent is further fed to the uranium adsorption zone to form the other boundary between the uranium adsorption zone and the reducing agent zone thereby to concentrate uranium-238 in the vicinity of the front boundary and uranium-235 in the vicinity of the rear boundary.

5. A process as claimed in claim 1, wherein the oxidizing agent is at least one member selected from the group consisting of salts of divalent copper, trivalent iron, tetravalent cerium, devalent manganese, tetravalent vanadium, hexavalent molybdenum and trivalent thallium.

6. A process as claimed in claim 1, wherein the oxidizing agent is a trivalent iron salt.

7. A process as claimed in claim 1, wherein the reducing agent is at least one member selected from the group consisting of trivalent vanadium salts, pentavalent molybdenum salts, trivalent titanium salts and divalent tin salts.

8. A process as claimed in claim 1, wherein the reducing agent is a trivalent titanium salt.

9. A process as claimed in claim 1, wherein the concentrations of the oxidizing agent, uranium ion and the reducing agent are from 0.02 to 2.0 mol/liter, from 0.01 to 1.0 mol/liter and from 0.01 to 1.0 mol/liter, respectively.

10. A process as climed in claim 9, wherein the concentration of uranium ion is in the range from 0.10 to 0.50 mol/liter.

11. A process as claimed in claim 1, wherein the separation is operated in the presence of 1 to 6 mol/liter hydrochloric acid or hydrobromic acid in the external solution in contact with the anion exchange material.

12. A process as claimed in claim 1, wherein the separation is operated at a temperature of 60° C or higher.

13. A process as claimed in claim 8, wherein the separation is operated at a temperature of 60° C or higher in the presence of an agent which prevents titanium precipitation.

14. A process as claimed in claim 13, wherein the agent is at least one compound selected from the group consisting of oxalic acid, tartaric acid, citric acid, malonic acid, glutaric acid, succinic acid, maleic acid, fumaric acid, salicylic acid, 5-sulfosalicylic acid, and salts of these acids, catechol, resorcinol, tiron, chromotropic acid, glucose, fructose, mannose, galactose, arabinose, ribose, xylose, erythrose, sorbitol, mannitol, arabitol, glucono-δ-lactone, glucono-γ-lactone, gluconic acid, mannonic acid, uronic acid, α-keto gluconic acid and methyl glucoside.

15. A process as claimed in claim 1, wherein the ratio of uranous ion concentration to uranyl ion concentration is substantially equal to the square root of the selectivity coefficient.

16. A process as claimed in claim 1, wherein the electron exchange catalyst is at least one member selected from the group consisting of metal ions of molybdenum, vanadium, copper, indium, rhenium, yttrium, ruthenium, arsenic, and the ions of atomic groups containing said metals, provided that atomic groups with zero valency are excluded.

17. A process as claimed in claim 1, wherein the electron exchange catalyst is at least one member selected from the group consisting of piperidine, piperazine, ethylene diamine, propylene diamine, 1,3-diaminopropane, ethanolaine, p-phenylenediamine, imidazole, pyridine, α,β or, γ-picoline; derivatives thereof; and salts thereof; acetic acid, gluconic acid, tartaric acid, citric acid, 5-sulfosalicylic acid; derivatives thereof; and salts thereof; tiron, chromotropic acid and salts thereof; ethylene glycol, methanol, ethanol, propanol, acetone and acetonitrile; p-benzoquinone, duroquinone, chloranyl, chlornaylic acid and β-naphthoquinone; hydroquinone, catechol and resorcinol; alloxan, methyl alloxan, alloxantin and methyl alloxantin.

18. A process as claimed in claim 1, wherein the electron exchange catalyst contains ions of iron.

19. A process as claimed in claim 1, wherein the electron exchange catalyst is a combination of at least one member selected from the group consisting of metal ions of molybdenum, vanadium, copper, indium, rhenium, yttrium, ruthenium, arsenic, and the ions of atomic groups containing said metals, provided that atomic groups with zero valency are excluded, with at least one member selected from the group consisting of piperidine, piperazine, ehtylene diamine, propylene diamine, 1,3-diaminopropane, ethanolamine, p-phenylenediamine, imidazole, pyridine, α,β or γ-picoline; derivatives thereof; and salts thereof; acetic acid, gluconic acid, tartaric acid, citric acid, 5-sulfosalicylic acid; derivatives thereof; and salts thereof; tiron, chromotropic acid and salts thereof; ethylene glycol, methanol, ethanol, propanol, acetone and acetonitrile; p-benzoquinone, duroquinone, chloranyl, chloranylic acid and β-naphthoquinone; hydroquinone, catechol and resorcinol; alloxan, methyl alloxan, alloxantin and methyl alloxantin.

20. A process as claimed in claim 18, wherein the electron exchange catalyst is a combination of ions of iron with at least one member selected from the group consisting of metal ions of molybdenum, vanadium, copper, indium, rhenium, yttrium, ruthenium, arsenic, and the ions of atomic groups containing said metals, provided that atomic groups with zero valency are excluded.

21. A process as claimed in clim 18, wherein the electron exchange catalyst is a combination of ions of iron with at least one member selected from the group consisting of piperdine, piperazine, ethylene diamine, propylene diamine, 1,3-diaminopropane, ethanolamine, p-phenylenediamine, imidazole, pyridine, α, β or γ-picoline; derivatives thereof; and salts thereof; acetic acid, gluconic acid, tartaric acid, citric acid, 5-sulfosalicylic acid; derivatives thereof; and salts thereof; tiron, chromotropic acid and salts thereof; ethylene glycol, methanol, ethanol, propanol, acetone and acetonitrile; p-benzoquinone, duroquinone, chloranyl, chloranylic acid and β-naphthoquinone; hydroquinone, catechol and resorcinol; alloxan, methyl alloxan, alloxantin and methyl alloxantin.

* * * * *